(12) United States Patent
Furnari

(10) Patent No.: US 10,373,112 B2
(45) Date of Patent: Aug. 6, 2019

(54) COLOR CHIP DISPENSER

(71) Applicant: Behr Process Corporation, Santa Ana, CA (US)

(72) Inventor: Sarah Joanna Furnari, Costa Mesa, CA (US)

(73) Assignee: Behr Process Corporation, Santa Ana, CA (US)

( * ) Notice: Subject to any disclaimer, the term of this patent is extended or adjusted under 35 U.S.C. 154(b) by 153 days.

(21) Appl. No.: 15/421,000

(22) Filed: Jan. 31, 2017

(65) Prior Publication Data

US 2018/0218315 A1    Aug. 2, 2018

(51) Int. Cl.
| | |
|---|---|
| *G06K 7/14* | (2006.01) |
| *G06F 3/041* | (2006.01) |
| *G06Q 10/08* | (2012.01) |
| *H05B 37/02* | (2006.01) |
| *G06F 3/0354* | (2013.01) |

(52) U.S. Cl.
CPC ....... *G06Q 10/087* (2013.01); *G06F 3/03547* (2013.01); *G06F 3/041* (2013.01); *G06K 7/1413* (2013.01); *G06K 7/1417* (2013.01); *H05B 37/02* (2013.01)

(58) Field of Classification Search
CPC .. G06Q 10/087; G06K 7/1413; G06K 7/1417; G06F 3/041
USPC ............................................ 705/28; 235/383
See application file for complete search history.

(56) References Cited

U.S. PATENT DOCUMENTS

| | | | |
|---|---|---|---|
| 4,667,959 A | 5/1987 | Pfeiffer et al. | |
| 4,812,985 A * | 3/1989 | Hambrick | G06Q 10/087 221/9 |
| 8,444,147 B2 | 5/2013 | Grauzer et al. | |
| 2005/0055361 A1* | 3/2005 | Deal | G06Q 10/06 |
| 2009/0161357 A1 | 6/2009 | Carlson et al. | |
| 2009/0276091 A1 | 11/2009 | Duha et al. | |
| 2010/0100236 A1* | 4/2010 | Segal | G07F 9/02 700/232 |
| 2010/0244700 A1* | 9/2010 | Chong | G01N 21/255 315/113 |

(Continued)

FOREIGN PATENT DOCUMENTS

| | | |
|---|---|---|
| WO | WO-2009082737 A1 | 7/2009 |
| WO | WO-2009132420 A1 | 11/2009 |

*Primary Examiner* — Florian M Zeender
*Assistant Examiner* — Nicole Elena Bruner
(74) *Attorney, Agent, or Firm* — Harness, Dickey & Pierce, P.L.C.

(57) ABSTRACT

Systems and methods for a color chip dispenser are provided and include a card shuffler device that receives color chips, each having a sample area displaying a color and an optical code area displaying a machine-readable optical code associated with the color. An optical code reader is configured to read optical codes and a robotic arm is configured to receive and grip color chips. A controller is configured to receive and decode the machine-readable optical code displayed in the optical code area of each of the color chips, determine whether a particular color chip corresponds to a selected coating color based on the decoded machine-readable optical code of the particular color chip, and control the robotic arm to display the particular color chip in a display area and/or dispense the particular color chip to a dispensing receptacle in response to the particular color chip corresponding to the selected coating color.

16 Claims, 5 Drawing Sheets

(56) References Cited

U.S. PATENT DOCUMENTS

| | | | |
|---|---|---|---|
| 2012/0170836 A1* | 7/2012 | Henry | G01J 3/52 382/162 |
| 2013/0310968 A1 | 11/2013 | Gottenbos | |

* cited by examiner

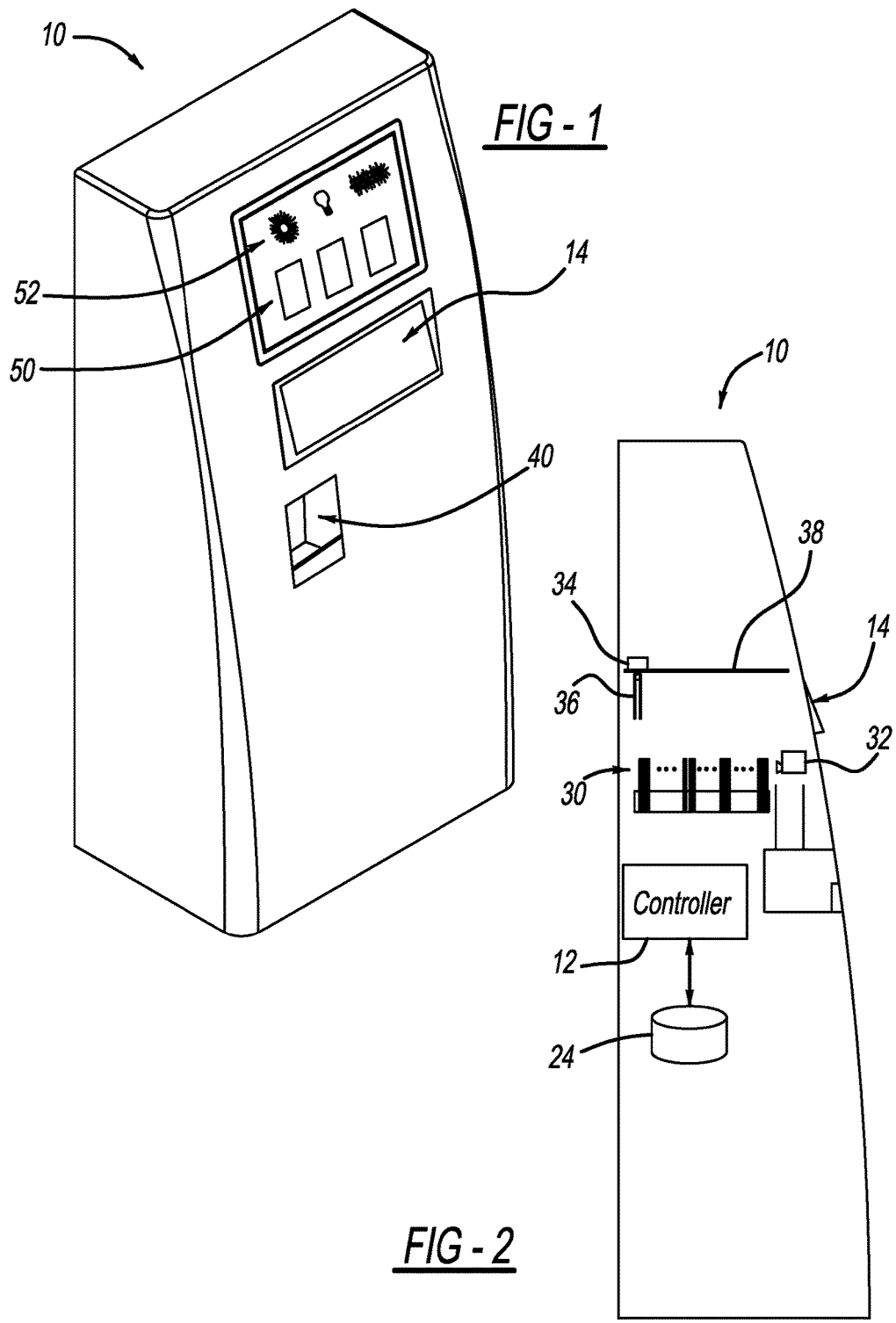

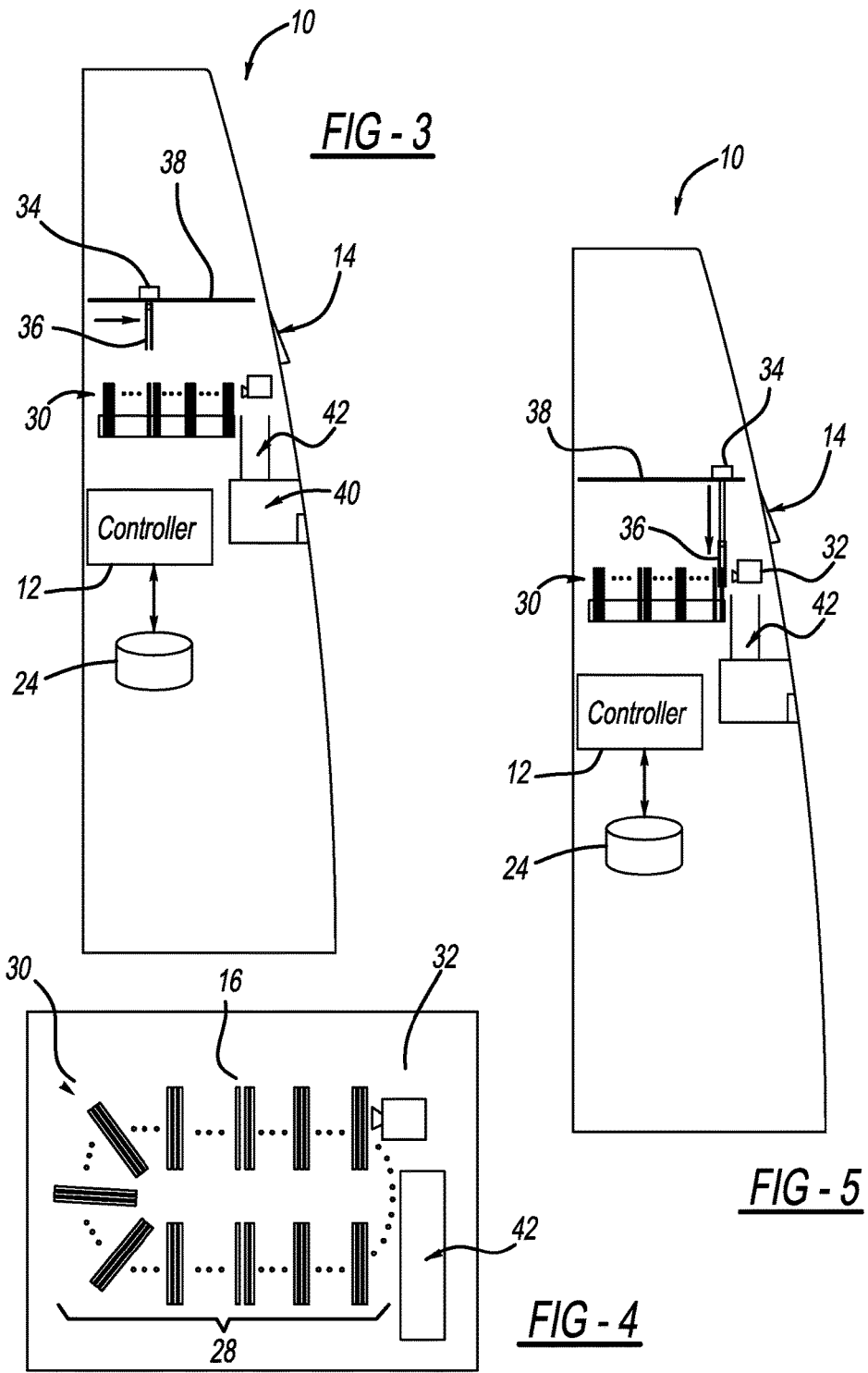

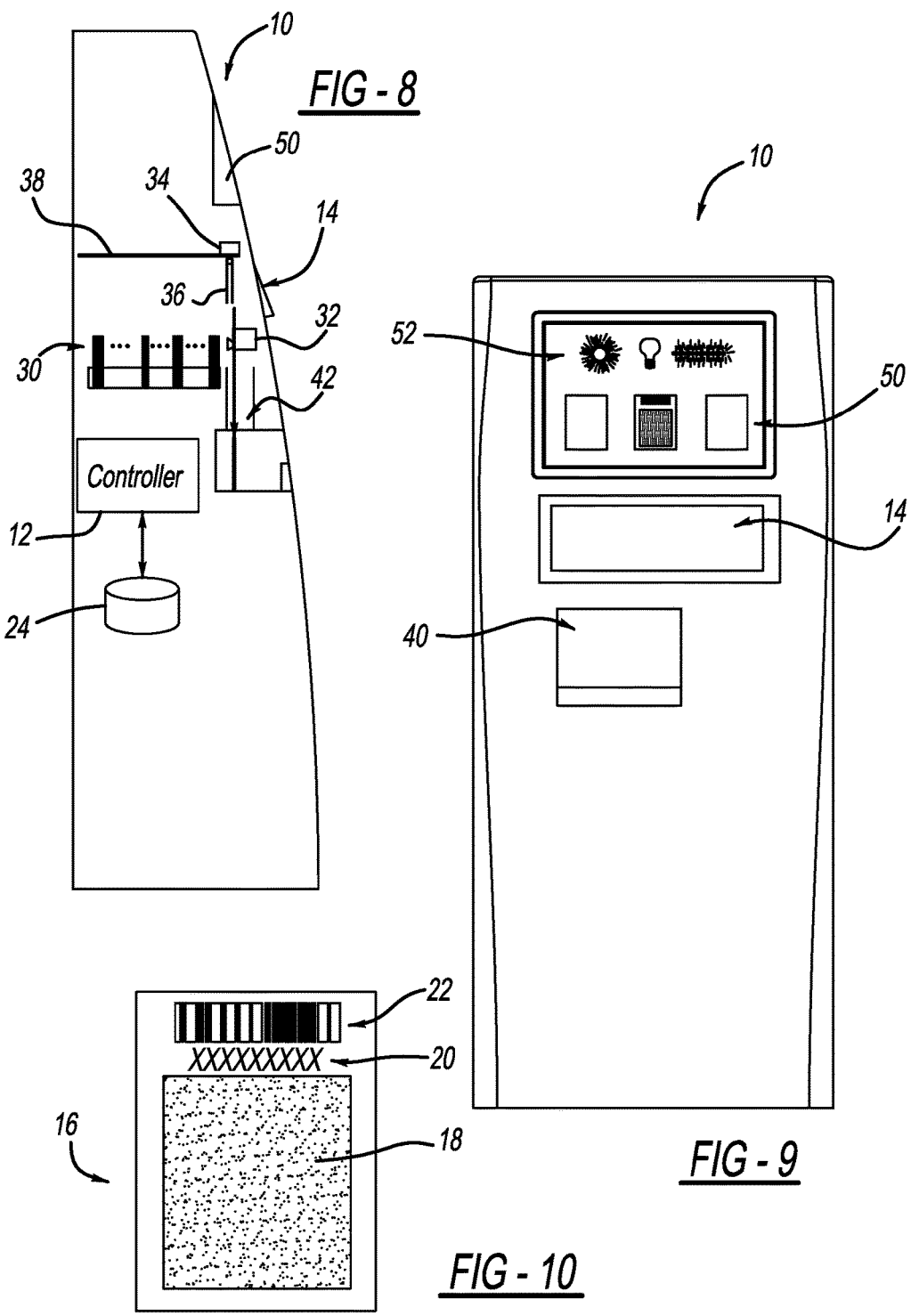

COLOR CHIP DISPENSER

FIELD

The present disclosure relates to a color chip dispenser and, more particularly, to a color chip dispenser that utilizes an optical code reader and a robotic arm to locate and retrieve a color chip from a deck of color chips.

BACKGROUND

This section provides background information related to the present disclosure, which is not necessarily prior art.

Retail stores that sell coating products, such as paints and stains, often include large display structures to store and display color chips used as samples for the various coating product colors available for purchase. Each color chip, for example, may show a particular coating color, along with a name and/or an identification code or number associated with the particular coating color. A consumer looking for a particular color chip is required to search the display looking for the particular color chip.

In addition, consumers may browse and select particular colors electronically using, for example, a website, a website application, a mobile application, etc. For example, a color selection and coordination system that allows a user to select a starting color and that provides coordinating colors for the starting color is described in U.S. Pat. No. 7,230,629, "Data-driven color coordinator," which is incorporated herein by reference. Due to the color variance inherent to digital monitors, once particular coating colors are selected electronically, a consumer may then search for corresponding color chips with samples of the particular coating colors. Searching for the physical color chips associated with particular coating colors in the display structure, however, can be tedious and time consuming for the consumer.

SUMMARY

This section provides a general summary of the disclosure, and is not a comprehensive disclosure of its full scope or all of its features.

The present disclosure provides a color chip dispenser that includes a card shuffler device configured to receive a plurality of color chips, each color chip including a sample area displaying a color and an optical code area displaying a machine-readable optical code associated with the color. The color chip dispenser also includes an optical code reader configured to read machine-readable optical codes and a robotic arm configured to receive and grip color chips. The color chip dispenser also includes a controller in communication with the optical code reader, the card shuffler device, and the robotic arm. The controller is configured to control the card shuffler device and the optical code reader to read the machine-readable optical code displayed in the optical code area of each of the color chips in the plurality of color chips. The color chip dispenser is also configured to receive and decode the machine-readable optical code displayed in the optical code area of each of the color chips in the plurality of color chips. The color chip dispenser is also configured to determine whether a particular color chip from the plurality of color chips corresponds to a selected coating color based on the decoded machine-readable optical code displayed in the optical code area of the particular color chip. The color chip dispenser is also configured to, in response to the particular color chip corresponding to the selected coating color, control the robotic arm to perform at least one of displaying the particular color chip in a display area of the color chip dispenser and dispensing the particular color chip to a dispensing receptacle of the color chip dispenser.

In some configurations, the display area includes a plurality of display windows, each display window being associated with a different type of light source. The controller can be further configured to receive a light source selection and to control the robotic arm to display the particular color chip in a display window from the plurality of display windows that corresponds to the light source selection.

In some configurations, the controller is further configured to, in response to none of the color chips from the plurality of color chips corresponding to the selected coating color, generate an alert indicating that the selected coating color was not found in the plurality of color chips.

In some configurations, the color chip dispenser also includes an input device and an output device in communication with the controller. The controller can receive input corresponding to the selected coating color from the input device.

In some configurations, the input device and the output device are included in a touch-screen device.

In some configurations, the controller is in communication with a color selection and coordination system and receives the selected coating color from the color selection and coordination system.

In some configurations, the machine-readable optical code associated with the color includes at least one of a barcode, a QR code, and an alphanumeric code.

In some configurations, the card shuffler device includes a motorized card shuffler that sequentially moves each color chip from the plurality of color chips in front of the optical code reader so that the optical code reader can read the machine-readable optical code displayed in the optical code area of each color chip.

In some configurations, the plurality of color chips includes duplicate color chips, each being associated with the same coating color.

In some configurations, the controller is further configured to perform an inventory of the plurality of color chips and to store inventory information in a computer-readable storage medium, the inventory information including identification information and amount information for each type of color chip in the plurality of color chips.

In another form, the present disclosures provides a method that includes receiving, with a card shuffler device of a color chip dispenser, a plurality of color chips, each color chip including a sample area displaying a color and an optical code area displaying a machine-readable optical code associated with the color, the color chip dispenser having an optical code reader configured to read machine-readable optical codes and a robotic arm configured to receive and grip color chips. The method also includes controlling, with a controller in communication with the optical code reader, the card shuffler device, and the robotic arm, the card shuffler device and the optical code reader to read the machine-readable optical code displayed in the optical code area of each of the color chips in the plurality of color chips. The method also includes receiving and decoding, with the controller, the machine-readable optical code displayed in the optical code area of each of the color chips in the plurality of color chips. The method also includes determining, with the controller, whether a particular color chip from the plurality of color chips corresponds to a selected coating color based on the decoded machine-readable optical code displayed in the optical code area of the particular color chip. The method also includes controlling, with the controller, the robotic arm to perform at least one of displaying the particular color chip in a display area of the color chip dispenser and dispensing the particular color chip to a dispensing receptacle of the color chip dispenser in response to the particular color chip corresponding to the selected coating color.

In some configurations, the display area includes at least one display window. The method can also include receiving, with the controller, a light source selection and controlling, with the controller, the robotic arm to display the particular color chip in the at least one display window illuminated by the light source selection.

In some configurations, the method also includes generating, with the controller, an alert indicating that the selected coating color was not found in the plurality of color chips in response to none of the color chips from the plurality of color chips corresponding to the selected coating color.

In some configurations, the color chip dispenser further comprises an input device and an output device in communication with the controller, and the method also includes receiving, with the controller, input corresponding to the selected coating color from the input device.

In some configurations, the input device and the output device are included in a touch-screen device.

In some configurations, the controller is in communication with a color selection and coordination system. The method can also include receiving, with the controller, the selected coating color from the color selection and coordination system.

In some configurations, the machine-readable optical code associated with the color includes at least one of a barcode, a QR code, and an alphanumeric code.

In some configurations, the card shuffler device includes a motorized card shuffler that sequentially moves each color chip from the plurality of color chips in front of the optical code reader so that the optical code reader can read the machine-readable optical code displayed in the optical code area of each color chip.

In some configurations, the plurality of color chips includes duplicate color chips, each being associated with the same coating color.

In some configurations, the method also includes performing, with the controller, an inventory of the plurality of color chips and storing, with the controller, inventory information in a computer-readable storage medium, the inventory information including identification information and amount information for each type of color chip in the plurality of color chips.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a color chip dispenser according to the present disclosure.

FIG. 2 is a side view of a color chip dispenser, showing selected internal features, according to the present disclosure.

FIG. 3 is a side view of a color chip dispenser, showing selected internal features, according to the present disclosure.

FIG. 4 is a top view of a color chip dispenser, showing selected internal features, according to the present disclosure.

FIG. 5 is a side view of a color chip dispenser, showing selected internal features, according to the present disclosure.

FIG. 8 is a side view of a color chip dispenser, showing selected internal features, according to the present disclosure.

FIG. 9 is a front view of a color chip dispenser, showing selected internal features, according to the present disclosure.

FIG. 10 is a front view of a color chip, according to the present disclosure.

Corresponding reference numerals indicate corresponding parts throughout the several views of the drawings.

DETAILED DESCRIPTION

Figure 6:
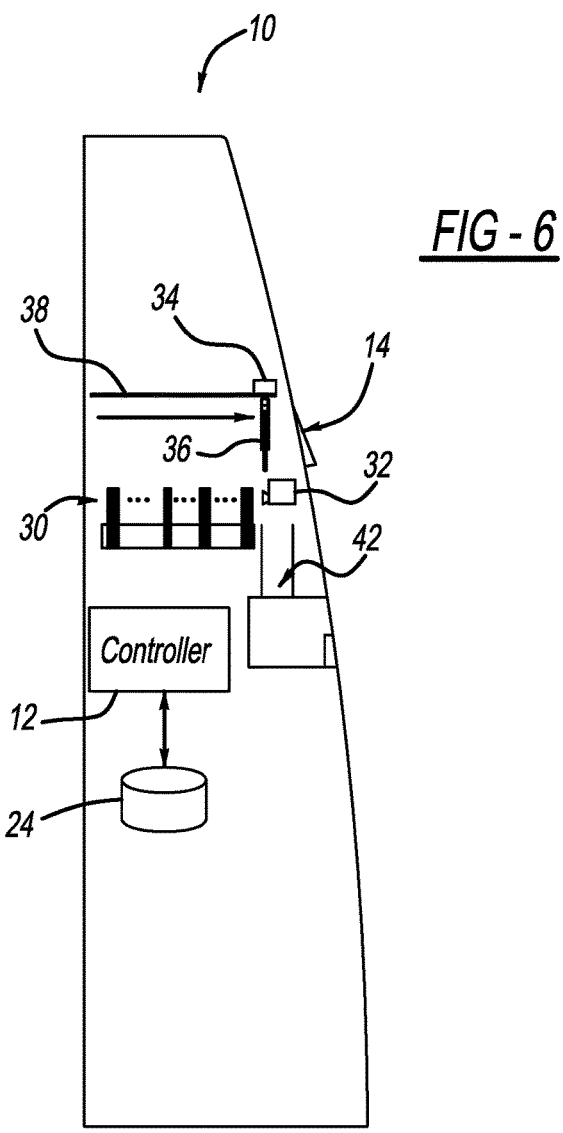
FIG. 6 is a side view of a color chip dispenser, showing selected internal features, according to the present disclosure.

Example embodiments will now be described more fully with reference to the accompanying drawings.

With reference to FIGS. 1 to 9, a color chip dispenser 10 includes a controller 12 in communication with a computer-readable storage medium 24 and a touch-screen device 14 that receives input from and displays output to a user. For example, the touch-screen device 14 may receive user input to select a particular coating color and communicate the user input and/or the selected coating color to the controller 12. For further example, the touch-screen device 14 may receive user input indicating a coating color by a color name and/or by a color identification code or number. For further example, the controller 12 and touch-screen device 14 may be part of an integrated color selection and coordination system that allows a user to browse a database of colors to select a starting color and that provides and displays to the user coordinating colors for the selected starting color, as described in U.S. Pat. No. 7,230,629, "Data-driven color coordinator," which is incorporated herein by reference. The computer-readable storage medium 24 stores computer-executable code with instructions for the controller 12 to operate and perform the functionality for receiving input from and displaying output to a user via the touch-screen device 14 and for displaying and dispensing color chips, as described in the present disclosure. While an integrated touch-screen device 14 is described and shown in the figures, separate input devices, such as a keyboard and mouse, and separate output devices, such as a monitor screen, can alternatively be used.

With reference to FIG. 10, a color chip 16 includes a sample area 18 showing the particular coating color and a name area 20 showing an alphanumeric color name associated with the coating color. Optionally, the sample area 18 may include an optical code area 22 showing a particular machine-readable optical code associated with the coating color. The machine-readable optical code may be, for example, a barcode, a Quick Response (QR) code (i.e., a two-dimensional barcode), or an alphanumeric code associated with and used for identifying the particular coating color. Alternatively, the alphanumeric color name associated with the coating color may serve as the machine-readable optical code. While the present disclosure provides a barcode, a QR code, and an alphanumeric code as examples, other suitable machine-readable optical codes may be used.

With reference again to FIGS. 1 through 10, once a particular coating color is inputted or selected by the user via the touch-screen device 14, the controller 12 can retrieve and dispense a color chip 16 associated with the particular coating color to the user. For example, the color chip dispenser 10 includes a deck 28 of color chips 16 arranged in a card shuffler device 30 and an optical code reader 32. The card shuffler device 30 includes a motorized card shuffler that sequentially moves the color chips 16 in front of the optical code reader 32. The optical code reader 32 reads the machine-readable optical code for each color chip 16 in the deck 28 from the optical code area 22 of the color chip 16 and communicates the machine-readable optical code to the controller 12. The controller 12 decodes the received optical code for the color chip 16 to determine a color name and/or a color identification code or number associated with the particular color chip 16. The controller 12 then compares the color name and/or color identification code or number of the particular color chip 16 with the color name and/or color identification code or number of the particular coating color that was inputted or selected by the user via the touch-screen device 14. If the color chip 16 matches the particular coating color inputted or selected by the user, the controller 12 stops the card shuffler device 30 with the particular color chip 16 located in a predetermined position. For example, the predetermined position may be the color chip location immediately in front of the optical code reader 32. If the color chip 16 does not match the particular coating color inputted or selected by the user, the controller 12 continues operation of the card shuffler device 30 to move the next color chip 16 in the deck 28 in front of the optical code reader 32 for identification. The controller 12 continues operation in this manner until the color chip 16 associated with the particular coating color is found or until all of the color chips 16 in the deck 28 have been analyzed.

Once the color chip 16 associated with the particular coating color is found in the deck 28, the controller 12 controls a robotic arm 34 to move to the location of the particular color chip 16, as shown in FIGS. 3 and 5. For example, the robotic arm 34 may include a motorized transport device to move the robotic arm linearly along a track 38. Once the robotic arm 34 is aligned with the location of the particular color chip 16, the controller 12 controls the robotic arm 34 to lower a pincer device 36 to receive and grip the particular color chip 16, as shown in FIG. 5.

Figure 7:
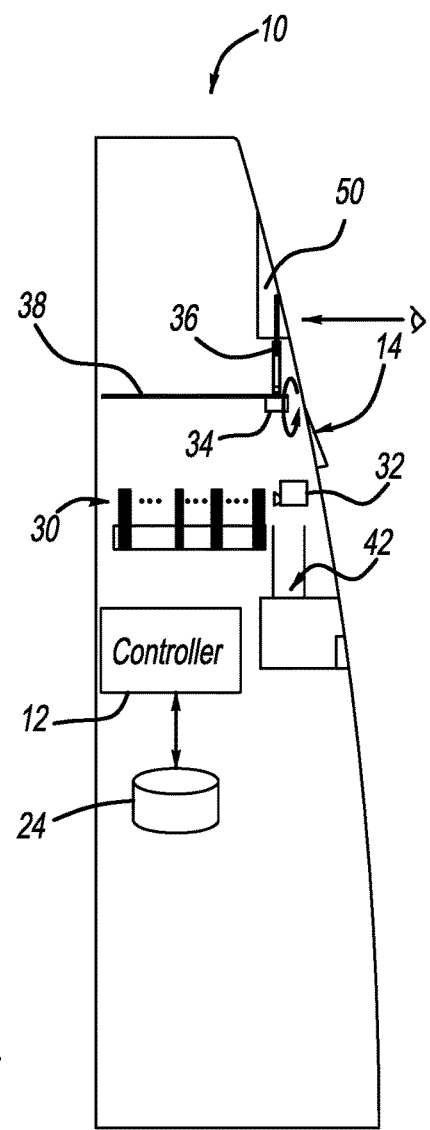
FIG. 7 is a side view of a color chip dispenser, showing selected internal features, according to the present disclosure.

Once the particular color chip 16 is retrieved by the robotic arm 34 from the deck 28, depending on input received from the user, the color chip 16 can either be dispensed or displayed to the user. For example, with reference to FIGS. 7 and 9, when the user opts to display the particular color chip 16, the controller 12 controls the robotic arm 34 to display the color chip 16 in a display area of the color chip dispenser 10. For example, the display area of the color chip dispenser may include the lighting display windows 50, shown in FIG. 9, For example, the color chip dispenser 10 can be configured with one or more display windows 50. When multiple display windows 50 are used, different light sources can be used with the individual display windows 50 to display the color chip 16 in different types of light. As shown in FIG. 9, three different light sources or light types, as indicated by the lighting labels 52, can be associated, respectively, with three different display windows 50. For example, a first display window can be associated with a soft white light emitting diode (LED) light source. A second display window can be associated with a bright white LED light source. A third display window can be associated with a daylight type LED light source. Additionally or alternatively, other light types or light sources can be used. For example, a display window could be included with a fluorescent type light source. The user may select a particular light type or light source via the touch-screen device 14. While different light types or light sources can be associated with separate display windows from the multiple display windows 50, alternatively, all of the multiple display windows 50 can be illuminated by the same light source. For example, the color chip dispenser 10 may be configured with multiple light sources such that a user can select a particular type of light source that then illuminates all of the multiple display windows 50. Alternatively, the color chip dispenser 10 can include separate input buttons or switches that can be depressed or actuated by the user to indicate a selection for a particular light type or light source. For example, the color chip dispenser 10 can include a button or switch associated with each of the display windows 50. The controller 12 can receive the user inputted selection and can then control the robotic arm 34 to position the particular color chip 16 in the display window 50 corresponding to the user inputted selection. For example, as shown in FIG. 7, the controller 12 can control the robotic arm 34 to rotate around the track 38 and position the particular color chip 16 within the display window 50 corresponding to the selection. After the particular color chip 16 is displayed within a display window 50, the user may opt to either have the particular color chip 16 dispensed to a dispensing receptacle 40 or returned to the deck 28.

With reference to FIG. 8, when the user opts to dispense the particular color chip 16, the controller 12 controls the robotic arm 34 to position the particular color chip to align with a dispensing chute 42 so that the particular color chip 16 is received by a dispensing receptacle 40. The user may opt to first display the particular color chip 16 in one of the display windows 50 and then dispense the particular color chip 16. Alternatively, the user may opt to simply have the particular color chip 16 dispensed once it is located in the deck 28 without having it first displayed in a display window 50.

While FIGS. 2, 3, and 5 to 8 show a robotic arm 34 configured to move linearly and rotationally around a track 38, any suitable robotic arm can be used to retrieve a particular color chip 16 from the deck 28, position the particular color chip 16 within a display window 50, and/or dispense the particular color chip 16 to the dispensing chute 42 and dispensing receptacle 40, in accordance with the present disclosure. For example, an articulated robotic arm with one or more rotary joints can be used. Additionally or alternatively, a Cartesian robotic arm with one or more prismatic joints can be used. Additionally or alternatively, a selective compliance assembly robotic arm (SCARA) can be used. Additionally or alternatively, other suitable robotic arms or other pick and place type devices can be used to retrieve a particular color chip 16 from the deck 28, position the particular color chip 16 within a display window 50, and/or dispense the particular color chip 16 to the dispensing chute 42 and dispensing receptacle 40, in accordance with the present disclosure.

Figure 11:
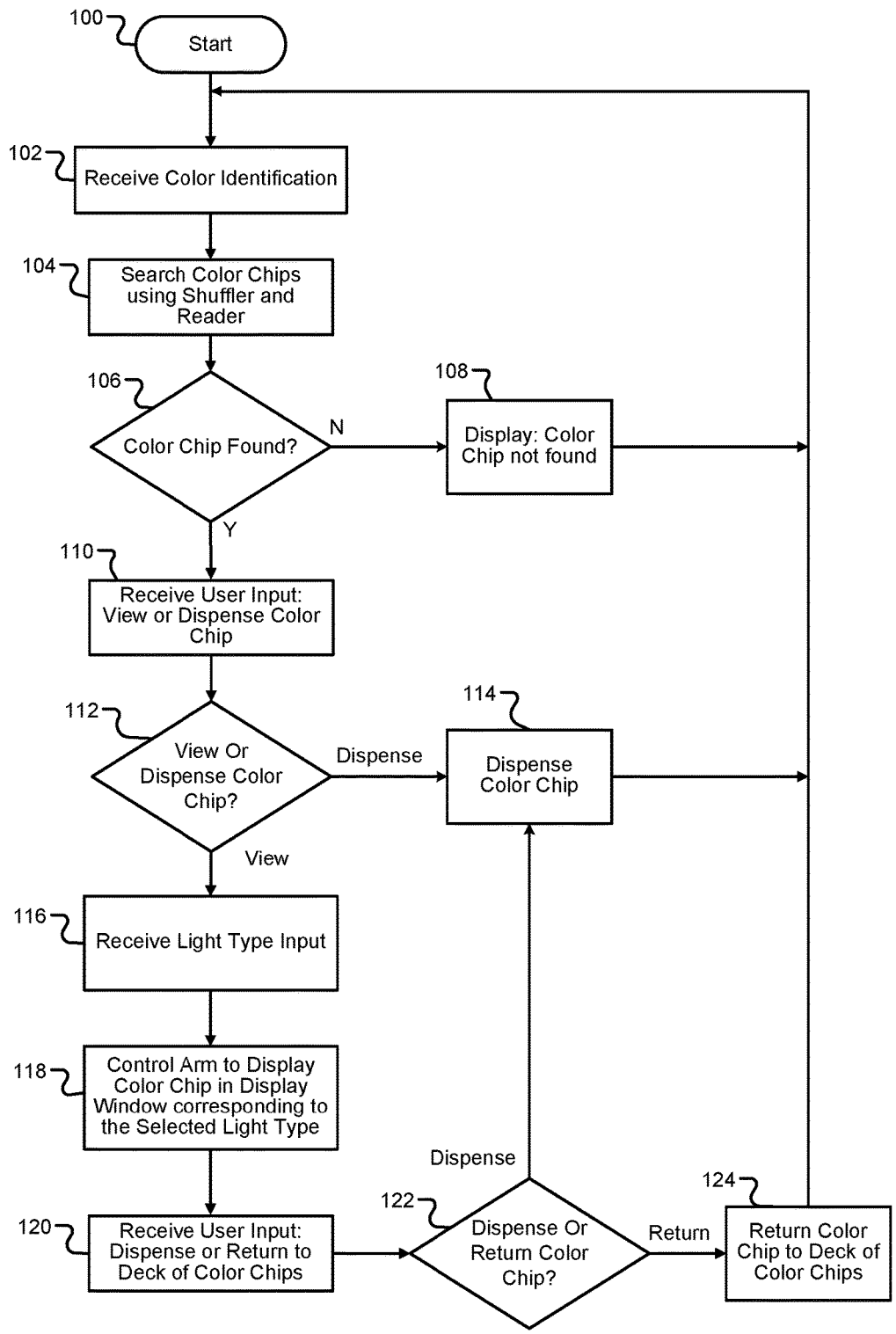
FIG. 11 is a flow chart for a color chip dispensing method according to the present disclosure.

With reference to FIG. 11, a flow chart for a color chip dispensing method according to the present disclosure is shown. The method can be performed by the controller 12. Additionally or alternatively, the method may be performed by another controller, computer, device, or module. The method starts at 100.

At 102, the controller 12 receives color identification input. As noted above, the controller 12 may receive user input via the touch-screen device 14 indicating a coating color by a color name and/or by a color identification code or number. Additionally or alternatively, the controller 12 and touch-screen device 14 may be part of an integrated color selection and coordination system that allows a user to browse a database of colors to select a starting color and that provides and displays to the user coordinating colors for the selected starting color, as described in U.S. Pat. No. 7,230,629, "Data-driven color coordinator," which is incorporated herein by reference. The user may then use the touch-screen device 14 to select a particular coating color using the color selection and coordination system and the controller 12 may then receive color identification input corresponding to the particular coating color selected using the color selection and coordination system. Further, the controller 12 may be in communication with a separate color selection and coordination system and may receive the color identification input from the separate color selection and coordination system. For example, the separate color selection and coordination system could be implemented by or with a mobile device and/or a remote computing device, such as a home computer, and the controller 12 could receive the color identification input from the mobile device and/or remote computing device.

At 104, as described above, the controller 12 controls the card shuffler device 30 and the optical code reader 32 to search through the color chips 16 within the deck 28 to find a color chip 16 corresponding to the coating color associated with the received color identification input.

At 106, the controller 12 determines whether the particular color chip 16 corresponding to the coating color associated with the received color identification input. At 106, when the particular color chip 16 has not been found in the deck 28, the controller 12 proceeds to 108 and controls the touch-screen device 14 to display a message to the user indicating that the particular color chip 16 was not found in the deck 28. Additionally, the controller 12 may generate an alert to a service person or retail clerk, for example, indicating that the particular color chip 16 has been requested but is not available in the deck. The controller 12 then loops back to 102.

At 106, when the particular color chip 16 has been found, the controller 12 proceeds to 110 and receives user input indicating to either view the particular color chip 16 or to dispense the particular color chip 16. For example, the controller 12 can control the touch-screen device 14 to prompt the user for the input indicating to either view or dispense the particular color chip 16.

At 112, the controller 12 determines whether the received user input indicates that the particular color chip 16 should be viewed or dispensed. When the user input indicates that the particular color chip 16 should be dispensed, the controller 12 proceeds to 114 and dispenses the particular color chip 16 to the dispensing receptacle 40, as described above.

At 112, when the user input indicates that the particular color chip 16 should be viewed, the controller proceeds to 116. At 116, when multiple display windows are used, the controller 12 receives user input indicating a particular light type for display. The controller 12 then proceeds to 118.

At 118, the controller 12 controls the robotic arm 34 to display the particular color chip 16 in the display window 50 corresponding to the selected light type. The controller 12 then proceeds to 120.

At 120, after displaying the particular color chip 16, the controller 12 receives user input indicating to either dispense the particular color chip 16 or return the particular color chip 16 to the deck 28. At 122, the controller 12 determines whether the received user input indicates that the particular color chip 16 should be dispensed or returned.

At 122, when the user input indicates that the particular color chip 16 should be dispensed, the controller 12 proceeds to 114 and controls the robotic arm 34 to dispense the particular color chip 16, and then loops back to 102. At 122, when the user input indicates that the particular color chip 16 should be returned to the deck 28, the controller 12 controls the robotic arm 34 to return the particular color chip 16 to the deck 28. The controller 12 then loops back to 102.

In this way, the color chip dispenser 10, along with the methods described in the present disclosure advantageously allow a user to quickly locate, view, and receive a particular color chip without having to spend time searching a large display of multiple color chips.

The card shuffler device 30 can be configured to be filled with color chips 16 by a service person or retail clerk, for example, without having particular color chips 16 located at specified locations. In other words, by using the optical code reader 32 to search the entire deck 28, the controller 12 is able to locate a particular color chip 16 regardless of its location within the deck 28. Further, the deck can include multiple duplicates of the same color chip 16. For example, a service person or retail clerk, for example, may include a relatively larger number of more popular color chips 16 in the deck 28 and may include a relatively smaller number of less popular color chips 16 in the deck 28. In this way, as particular color chips 16 are dispensed and removed from the deck 28, subsequent users are still able to view and receive the remaining duplicate color chips 16.

The controller 12 may be further configured to perform an inventory of all of the color chips 16 currently available in the deck 28. For example, upon startup or after a service person or retail clerk refills the deck 28, the controller 12 may control the card shuffler device 30 and the optical code reader 32 to perform an inventory and determine identification information for each type of color chip 16 in the deck 28 and the amount or number of each type of color chip 16 in the deck 28. The controller 12 may store the inventory information in the computer-readable storage medium 24. In this way, when the controller 12 receives input indicating color identification information for a particular color chip 16, the controller 12 may be able to determine, based on the inventory whether the particular color chip 16 is currently in the deck 28. If, based on the inventory information, the controller 12 determines that the particular color chip 16 is not currently in the deck 28, the controller 12 can simply display a message to the user that the particular color chip 16 is not available. Additionally, the controller 12 may generate an alert to a service person or retail clerk, for example, indicating that the particular color chip 16 has been requested but is not available in the deck. Additionally, the controller 12 could collect user input from the consumer indicating the consumer's mailing address so that the chip can be mailed to the consumer once it becomes available. Additionally or alternatively, if the color chip is available in the store outside of the color chip dispenser 10, the controller 12 may generate output to display the location in an associated color display where the color chip can be found by the consumer. Once the color chip dispenser 10 is restarted and/or refilled with additional color chips 16, the controller 12 may perform another inventory and update the inventory information in the computer-readable storage medium 24.

The controller 12 may be further configured to generate and output periodic reports indicating the number and types of color chips 16 that have been viewed and/or dispensed within a predetermined or selected time period, such as a day, a week, a month, a year, or any other suitable time period.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the terms controller or module may be replaced with the term circuit. The terms controller or module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A color chip dispenser comprising:
a card shuffler device configured to receive a plurality of color chips, each color chip including a sample area displaying a color and an optical code area displaying a machine-readable optical code associated with the color;
an optical code reader configured to read machine-readable optical codes;
a robotic arm configured to receive and grip color chips; and
a controller in communication with the optical code reader, the card shuffler device, and the robotic arm, the controller being configured to
(i) receive a selected coating color,
(ii) search the plurality of color chips for the selected coating color by controlling the card shuffler device and the optical code reader to sequentially move each of the color chips in the plurality of color chips in front of the optical code reader to read the machine-readable optical code displayed in the optical code area of each of the color chips in the plurality of color chips, by receiving and decoding the machine-readable optical code displayed in the optical code area of each of the color chips in the plurality of color chips, and by determining whether a particular color chip from the plurality of color chips matches the selected coating color based on the decoded machine-readable optical code displayed in the optical code area of the particular color chip, and (iii) in response to the particular color chip corresponding to the selected coating color, control the robotic arm to perform at least one of displaying the particular color chip in a display area of the color chip dispenser and dispensing the particular color chip to a dispensing receptacle of the color chip dispenser, wherein card shuffler device includes a motorized card shuffler that sequentially moves each of the color chips in the plurality of color chips in front of the optical code reader so that the optical code reader can read the machine-readable optical code displayed in the optical code area of each color chip; and wherein the display area includes a plurality of display windows and a plurality of input buttons, each input button being associated with a corresponding display window and each display window being associated with a different type of light source, the controller being further configured to receive a light source selection indicated by actuation of one of the input buttons and to control the robotic arm to display the particular color chip in a display window from the plurality of display windows that corresponds to the light source selection indicated by the actuation of the one of the input buttons.

2. The color chip dispenser recited by claim 1, wherein the controller is further configured to, in response to none of the color chips from the plurality of color chips corresponding to the selected coating color, generate an alert indicating that the selected coating color was not found in the plurality of color chips.

3. The color chip dispenser recited by claim 1, further comprising an input device and an output device in communication with the controller, wherein the controller receives input corresponding to the selected coating color from the input device.

4. The color chip dispenser recited by claim 3, wherein the input device and the output device are included in a touch-screen device.

5. The color chip dispenser recited by claim 1, wherein the controller is in communication with a color selection and coordination system and receives the selected coating color from the color selection and coordination system.

6. The color chip dispenser recited by claim 1, wherein the machine-readable optical code associated with the color includes at least one of a barcode, a QR code, and an alphanumeric code.

7. The color chip dispenser recited by claim 1, wherein the plurality of color chips includes duplicate color chips, each being associated with the same coating color.

8. The color chip dispenser recited by claim 1, wherein the controller is further configured to perform an inventory of the plurality of color chips and to store inventory information in a computer-readable storage medium, the inventory information including identification information and amount information for each type of color chip in the plurality of color chips.

9. A method comprising:

receiving, with a card shuffler device of a color chip dispenser, a plurality of color chips, each color chip including a sample area displaying a color and an optical code area displaying a machine-readable optical code associated with the color, the color chip dispenser having an optical code reader configured to read machine-readable optical codes and a robotic arm configured to receive and grip color chips; and receiving, with a controller in communication with the optical code reader and the card shuffler device, a selected coating color;

searching, with the controller, the plurality of color chips for the selected coating color by controlling the card shuffler device and the optical code reader to sequentially move each of the color chips in the plurality of color chips in front of the optical code reader to read the machine-readable optical code displayed in the optical code area of each of the color chips in the plurality of color chips, by receiving and decoding the machine-readable optical code displayed in the optical code area of each of the color chips in the plurality of color chips, and by determining whether a particular color chip from the plurality of color chips matches the selected coating color based on the decoded machine-readable optical code displayed in the optical code area of the particular color chip;

controlling, with the controller, the robotic arm to perform at least one of displaying the particular color chip in a display area of the color chip dispenser and dispensing the particular color chip to a dispensing receptacle of the color chip dispenser in response to the particular color chip corresponding to the selected coating color, the display area including a plurality of display windows and a plurality of input buttons, each input button being associated with a corresponding display window;

receiving, with the controller, a light source selection indicated by actuation of one of the input buttons; and controlling, with the controller, the robotic arm to display the particular color chip in a display window from the plurality of display windows that corresponds to the light source selection indicated by the actuation of the one of the input buttons;

wherein the card shuffler device includes a motorized card shuffler that sequentially moves each of the color chips in the plurality of color chips in front of the optical code reader so that the optical code reader can read the machine-readable optical code displayed in the optical code area of each color chip.

10. The method recited by claim 9, the method further comprising:

generating, with the controller, an alert indicating that the selected coating color was not found in the plurality of color chips in response to none of the color chips from the plurality of color chips corresponding to the selected coating color.

11. The method recited by claim 9, wherein the color chip dispenser further comprises an input device and an output device in communication with the controller, the method further comprising receiving, with the controller, input corresponding to the selected coating color from the input device.

12. The method recited by claim 11, wherein the input device and the output device are included in a touch-screen device.

13. The method recited by claim 9, wherein the controller is in communication with a color selection and coordination system, the method further comprising receiving, with the controller, the selected coating color from the color selection and coordination system.

14. The method recited by claim 9, wherein the machine-readable optical code associated with the color includes at least one of a barcode, a QR code, and an alphanumeric code.

15. The method recited by claim 9, wherein the plurality of color chips includes duplicate color chips, each being associated with the same coating color.

16. The method recited by claim 9, the method further comprising:
performing, with the controller, an inventory of the plurality of color chips; and
storing, with the controller, inventory information in a computer-readable storage medium, the inventory information including identification information and amount information for each type of color chip in the plurality of color chips.

* * * * *